United States Patent [19]
Kobayashi

[11] Patent Number: 4,543,617
[45] Date of Patent: Sep. 24, 1985

[54] RECORDING APPARATUS

[75] Inventor: Yoshikazu Kobayashi, Kawasaki, Japan

[73] Assignee: Nippon Columbia Kabushiki Kaisha, Tokyo, Japan

[21] Appl. No.: 395,979

[22] Filed: Jul. 7, 1982

[30] Foreign Application Priority Data

Jul. 15, 1981 [JP] Japan .................................. 56-110361

[51] Int. Cl.$^4$ ............................................. H04N 5/92
[52] U.S. Cl. .................... 358/342; 358/335; 369/59; 369/48; 369/111; 360/30; 360/33.1
[58] Field of Search ...................... 369/59, 47, 48, 111; 360/32, 33.1, 29, 30, 73, 41; 358/138, 342, 335, 337, 338; 375/48; 340/347 AD

[56] References Cited

U.S. PATENT DOCUMENTS

| | | | |
|---|---|---|---|
| 3,377,625 | 4/1968 | Filipowsky | 375/48 |
| 3,701,846 | 10/1972 | Zenefilis | 358/342 |
| 4,096,520 | 6/1978 | Furata | 375/48 |
| 4,223,349 | 9/1980 | Dakin | 358/342 |
| 4,228,326 | 10/1980 | Dakin | 369/50 |

Primary Examiner—Alan Faber
Attorney, Agent, or Firm—Murray Schaffer

[57] ABSTRACT

A frequency modulated (FM) signal is recorded as pits or dots along a track formed as a concentric or spiral shape on a recording medium such as a recording disc. The pits or dots are arranged on a radial line during at least a predetermined interval.

7 Claims, 28 Drawing Figures

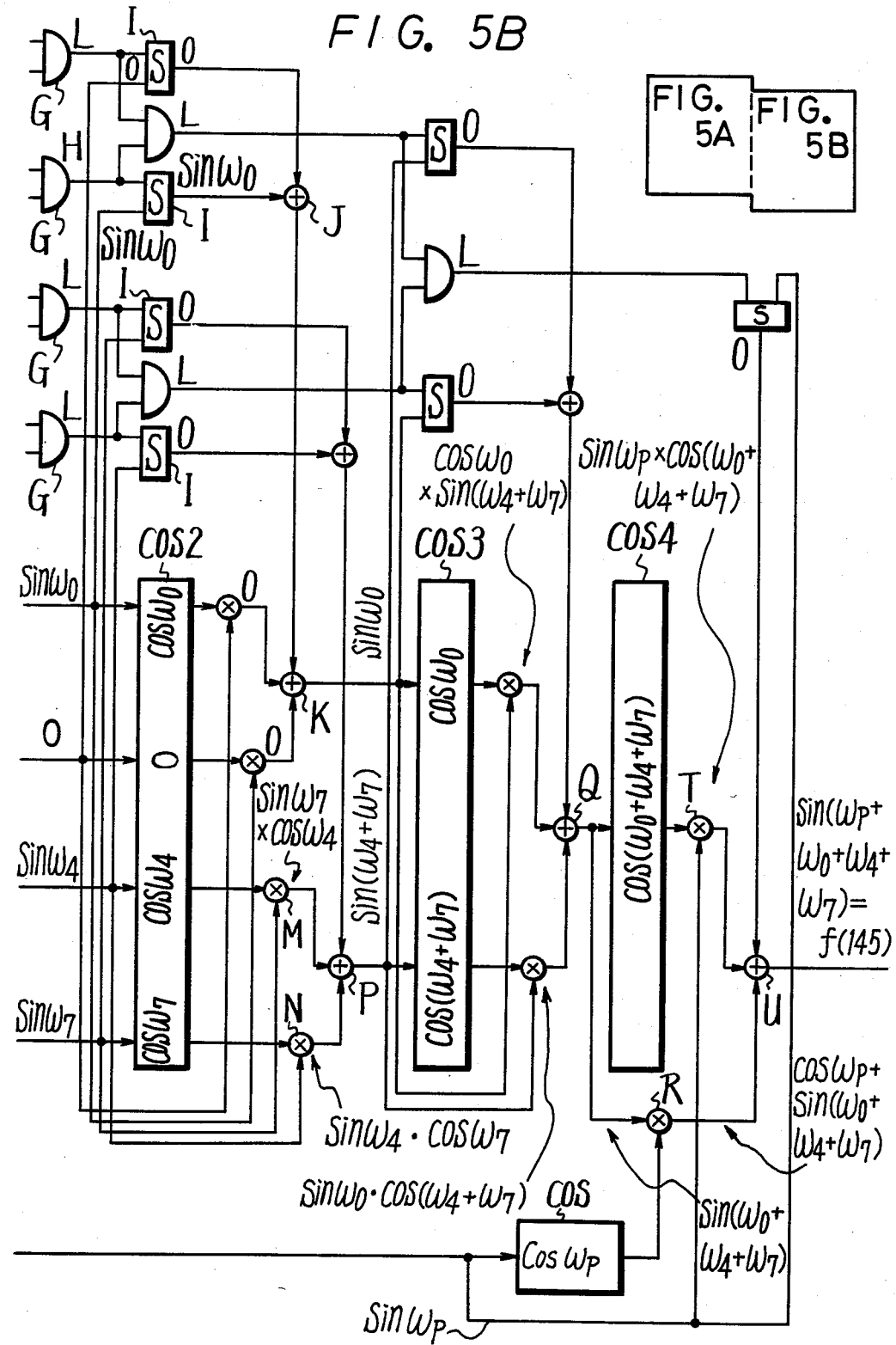

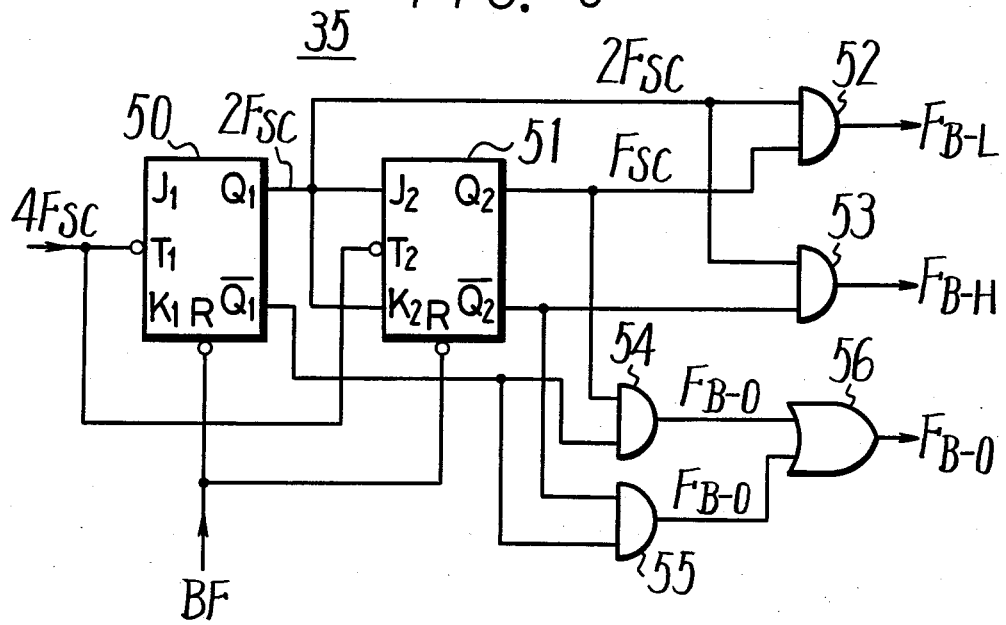
FIG. 6
FIG. 7A  $4F_{SC}$
FIG. 7B  $2F_{SC}$  $Q_1$
FIG. 7C  $F_{SC}$  $Q_2$
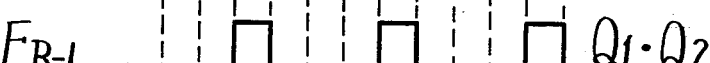
FIG. 7D  $F_{B-L}$  $Q_1 \cdot Q_2$
FIG. 7E  $F_{B-0}$  $\overline{Q_1} \cdot Q_2$
FIG. 7F  $F_{B-H}$  $Q_1 \cdot \overline{Q_2}$
FIG. 7G  $F_{B-0}$  $\overline{Q_1} \cdot \overline{Q_2}$

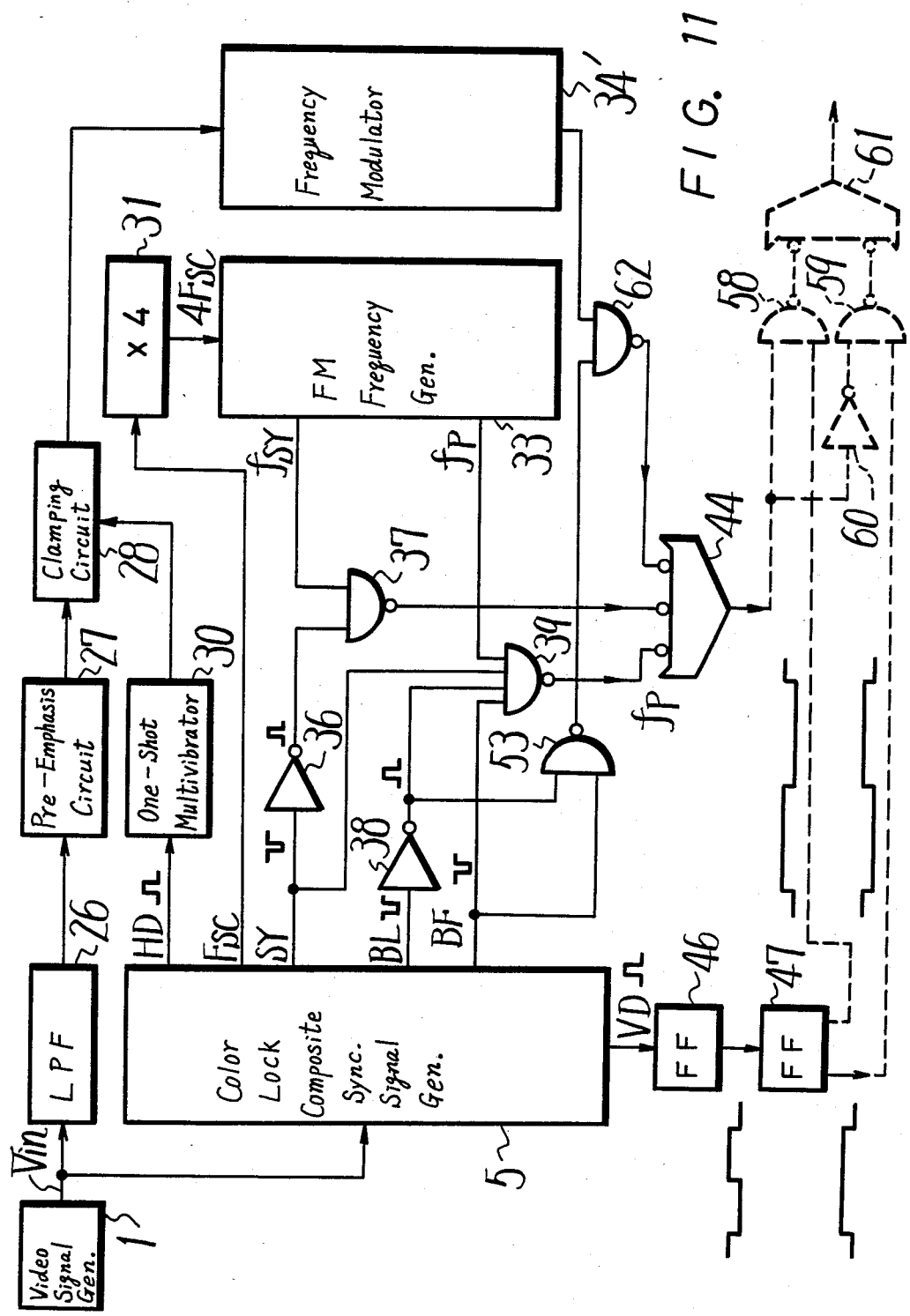

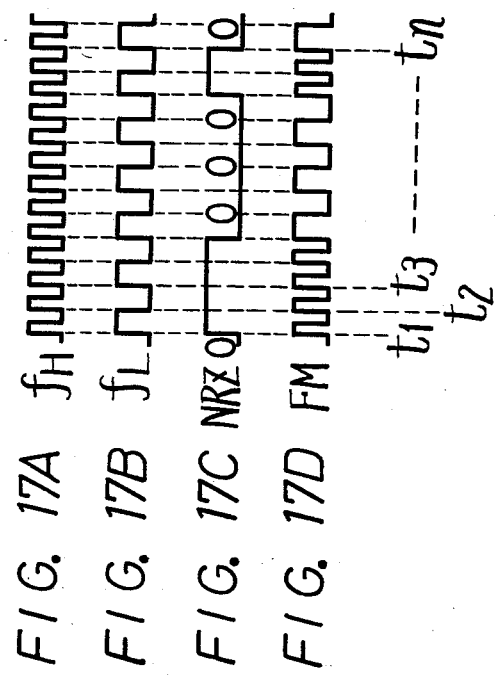
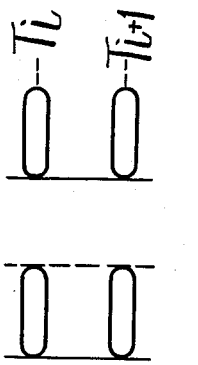
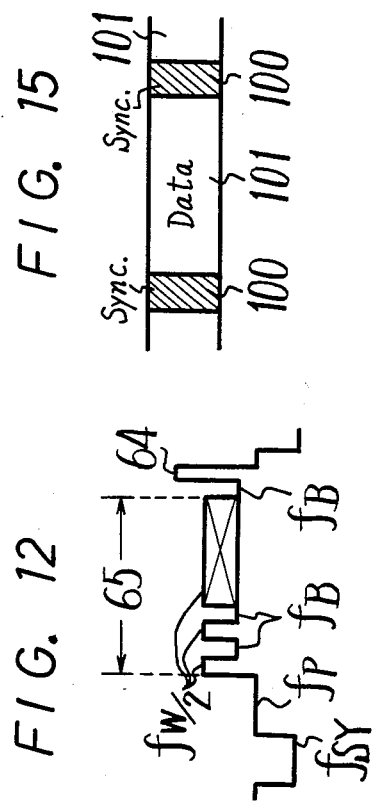
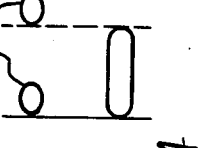
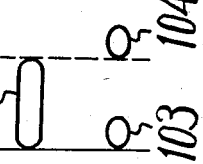
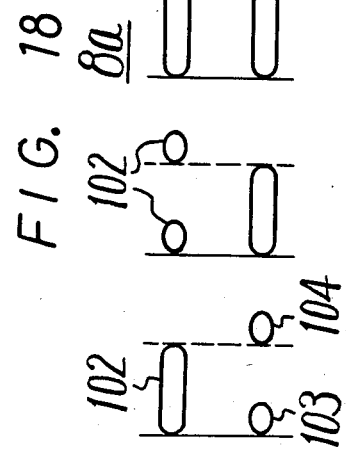
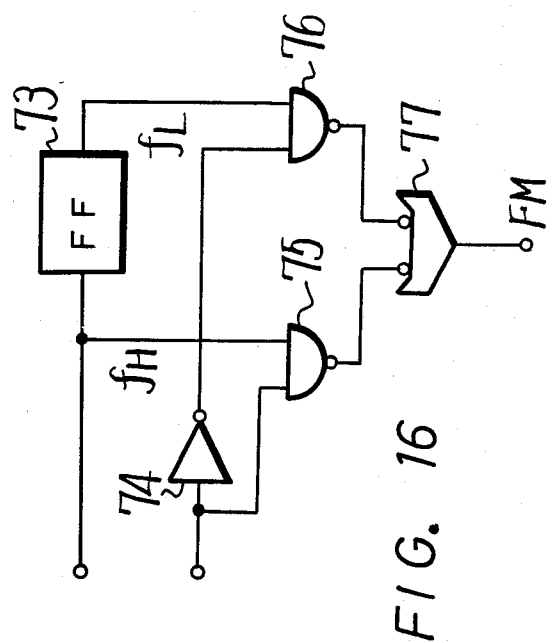

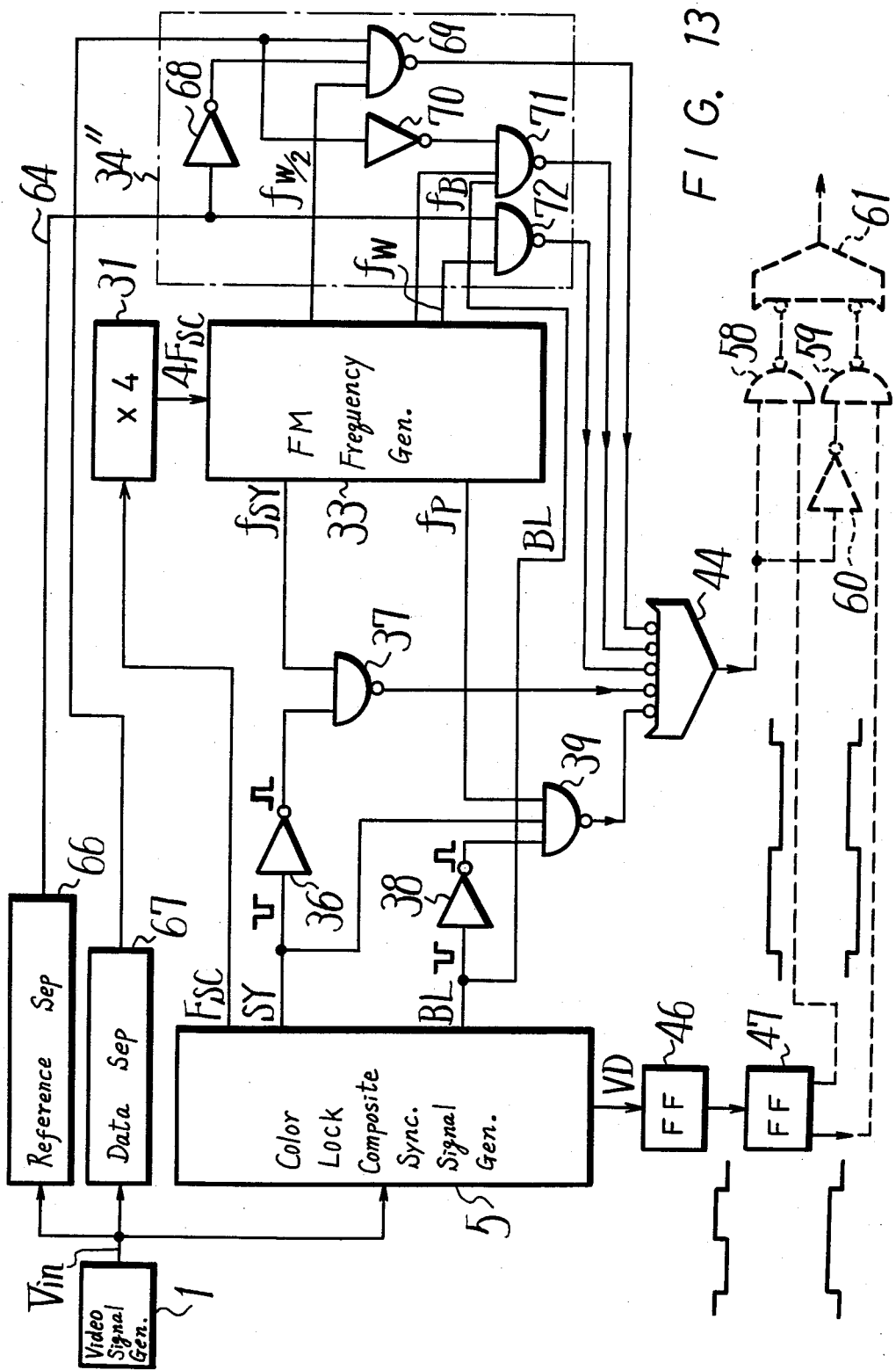

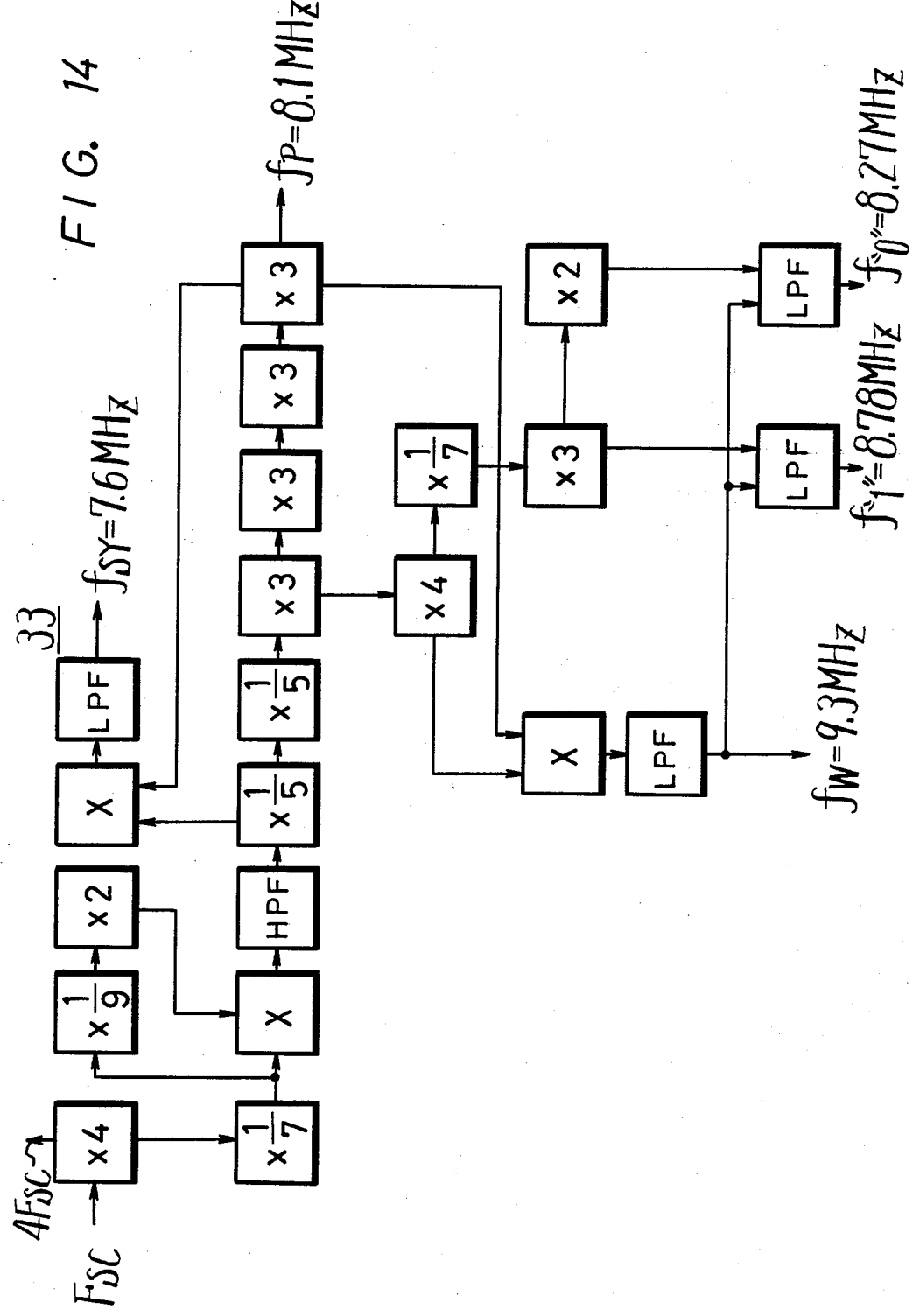

RECORDING APPARATUS

BACKGROUND OF THE INVENTION

1. Field of the Invention

This invention relates to recording apparatus, and more particularly to recording apparatus in which a recording signal such as a video signal or the like is frequency-modulated and then recorded on a recording medium such as a disc. The invention is also directed to a recording disc.

2. Description of the Prior Art

A prior art video disc recording apparatus will be described first.

FIG. 1 is a systematic block diagram thereof, in which reference numeral 1 denotes a video signal generator, 2 a frequency modulator to receive an output video signal $V_{in}$ supplied from the video signal generator 1, 3 an optical or photo modulator and 4 denotes an argon Ar laser source. The light beam emitted from the argon laser source 4 is turned on and off by the photo modulator 3 in response to the frequency-modulated (FM) signal derived from the frequency modulator 2. Numeral 5 denotes a color lock composite synchronizing signal generator supplied with the video signal $V_{in}$ from the video signal generator 1 to generate a color lock composite synchronizing signal. Numeral 6 denotes a rotary servo, 7 a motor, and numeral 8 denotes a recording disc. The rotary servo 6 is supplied with the output from the color lock composite synchronizing signal generator 5 so as to rotate the motor 7 at, for example, 1800 r.p.m in synchronism with the frame of the video signal.

In the conventional video disc recording apparatus, the frequency modulator 2 and the color lock composite synchronizing signal generator 5 are provided independently and therefore there is no relationship between them. The dotted line in FIG. 1, which connects both together is added to clarify the characteristics of the present invention as will be described later.

Numeral 9 designates an optical system feeding base, 10 a feeding motor thereof, 11 a guide shaft for the optical system feeding base 9, and 12 designates a feeding servo for the feeding motor 10. The feeding motor 10 is controlled by the feeding servo 12 so as to make the track pitch on the video disc 8 aligned, whereby the optical system feeding base 9 is forwarded at a predetermined feeding pitch (for example, 1.6 μm).

The light beam derived from the argon laser source 4 and turned on and off by the photo modulator 3 is diverged by an concave lens 13 provided within the optical system feeding base 9, the optical path (optical axis) of which is changed by 90° by a half mirror 14 and passed through a recording lens 15 to focus on the recording disc 8, whereby pits or dots (refer to FIG. 2) are formed on its recording surface 8a. A light beam derived from a helium He -neon laser 16 provided on the optical system feeding base 9 is passed through a beam splitter 17 and diverged by a concave lens 18. The optical axis thereof is changed by 90° by a half mirror 19 and impinged through the recording lens 15 on the recording disc 8 to be reflected. The reflected beam is again passed through the recording lens 15, the optical axis of which is changed by 90° by the half mirror 19 and passed through the concave lens 18. The optical axis thereof is changed by 90° by the beam splitter 17 and detected by an optical or photo detector 20. The output of the photo detector 20 is applied as a servo signal to a focus servo 21, the output of which is supplied to an actuator 22 so as to control the position of the recording lens 15 such that the light beam emitted from the argon laser source 4 may focus on the recording disc 8.

FIG. 2 is an enlarged diagram showing an arrangement state of pits or dots 24 formed on the recording surface 8a of the recording disc 8 as set forth above. Although in the previously proposed technique, in order to record the video signal of one frame on a track T of one circle form on the recording surface 8a of the recording disc 8, the rotation of the motor 7 is controlled, the FM frequency per se corresponding to the momentary value of the video signal level is not accurately synchronized in phase with each other at every frame so that the pits 24 are not formed in an aligned state between adjacent tracks, for example, tracks $T_i$ and $T_{i+1}$ (where i is a positive integer) as shown in FIG. 2. Thus in the reproducing mode, depending upon the size of the diameter of the reproducing light beam, crosstalk and jitter are caused to make it difficult to increase the recording density so much and it is necessary to compensate for the jitter.

OBJECTS AND SUMMARY OF THE INVENTION

Accordingly, an object of the present invention is to provide a recording apparatus and a recording disc thereby which can obviate the aforesaid defects.

Another object of the present invention is to provide a recording apparatus which can record a recording signal so as to reduce crosstalk between adjacent tracks caused in a reproducing mode, and a recording disc formed thereby.

Further object of the present invention is to provide a recording apparatus in which a frequency modulated (FM) signal corresponding to a recording signal is defined at every momentary level and locked to a synchronizing signal or clock signal so as to align pits between adjacent tracks thereby allowing the same to be recorded on a recording disc, and a recording disc formed thereby, in which crosstalk and jitter caused in a reproducing mode can be minimized.

According to an aspect of the present invention, there is provided a recording apparatus for recording a recording signal, which includes synchronizing signals arranged at times selected from respective times arranged with an equal interval, on a disc comprising:

- a frequency generating means for generating a plurality of frequencies synchronized with said synchronizing signal;
- a selecting means for selecting frequencies corresponding to respective levels of said recording signal from said plurality of frequencies;
- a means for synchronizing the rotation of said disc, on which said recording signal is recorded, with said synchronizing signal to thereby make the rotation period of said disc at a constant rotation speed an integer time as the period of said synchronizing signal; and
- a means for recording an output from said selecting means on said disc which rotates at said constant speed.

According to another aspect of the present invention, there is provided a recording disc on which a frequency modulated (FM) signal provided by frequency-modulating a recording signal is recorded as a series of dots arranged concentrically or spirally on its recording surface, said recording disc comprising the dots each arranged on said recording surface at least during a predetermined interval so as to form a radial alignment.

The other objects, features and advantages of the invention will become apparent from the following description taken in conjunction with the accompanying drawings through which the like references designate the same elements and parts.

BRIEF DESCRIPTION OF THE DRAWINGS

FIG. 6 is a block diagram showing one example of the burst phase signal generator shown in FIG. 3;

FIGS. 7A through 7G are waveform diagrams each being used to explain the operation of the burst signal generator of FIG. 6;

FIG. 11 is a block diagram schematically showing the essential part of another embodiment of the present invention;

FIG. 12 is a waveform diagram showing signals of other systems to which the present invention is applied;

FIG. 13 is a block diagram schematically showing a main part of another embodiment of the present invention which is applied to the example of the signals shown in FIG. 12;

FIG. 14 is a block diagram schematically showing part of the digital FM frequency generator with the synchronizing lock shown in FIG. 13;

FIG. 15 is a diagram showing a signal format of a signal to which the present invention can be applied;

FIG. 16 is a block diagram schematically showing the FM frequency generator with the synchronizing lock according to the other embodiment of the present invention;

FIGS. 17A to 17D are waveform diagrams each being used to explain the operation of the FM frequency generator with the synchronizing lock in FIG. 16; and FIG. 18 is an enlarged diagram showing the arrangement state of the pits.

DESCRIPTION OF THE PREFERRED EMBODIMENTS

Figure 3:
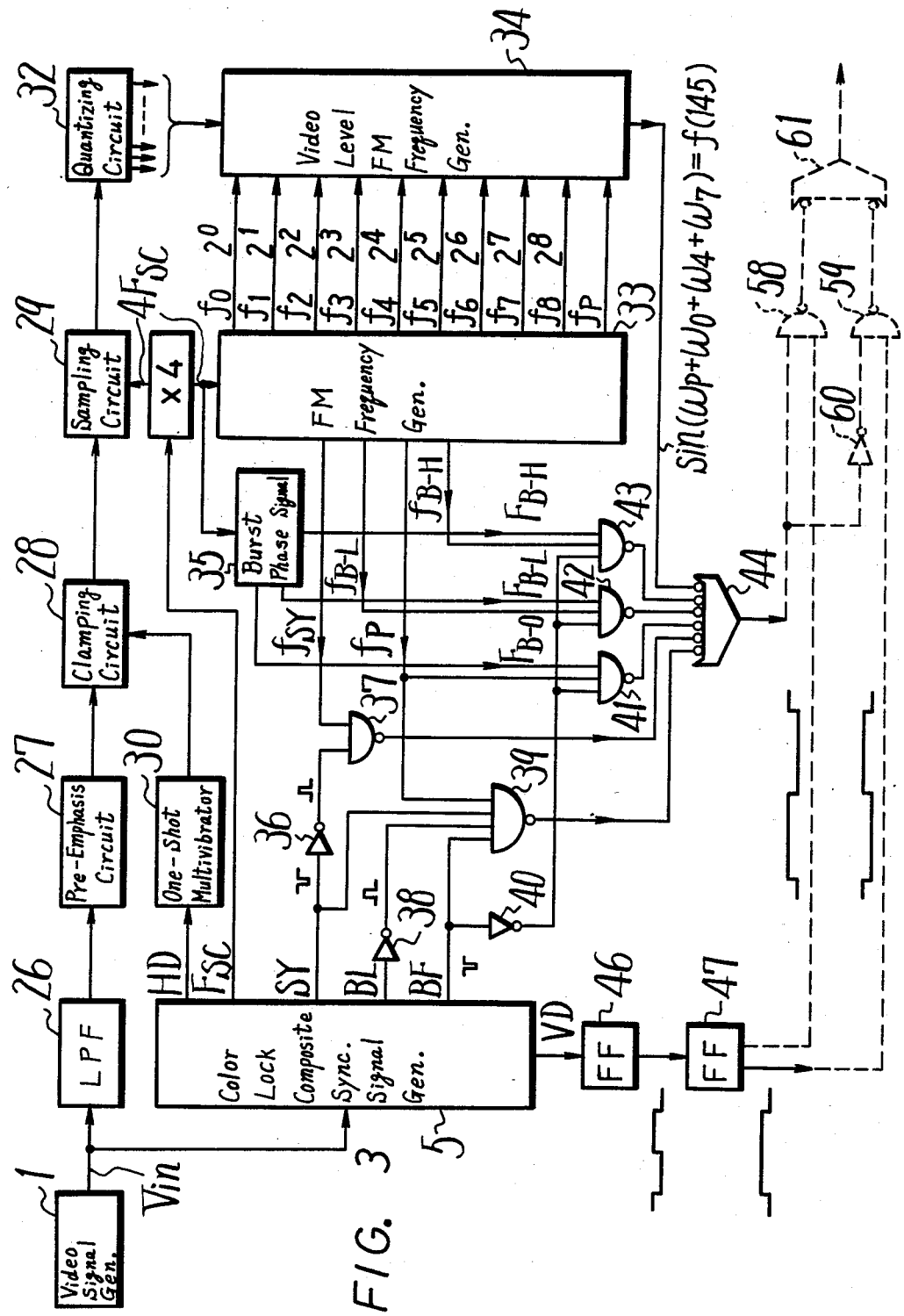
FIG. 3 is a block diagram schematically showing one example of a digital frequency modulation (FM) section which is a main section of the present invention.

FIG. 3 is a block diagram showing an example of a digital frequency modulation (FM) section used in a recording apparatus according to the present invention. In the example of FIG. 3, the video signal $V_{in}$ derived from the video signal generator 1 is applied through a low pass filter 26, a pre-emphasis circuit 27 and a clamping circuit 28 to a sampling circuit 29. Whereas, the video signal $V_{in}$ is introduced to the color lock composite synchronizing signal generator 5, from which predetermined vertical driving signal VD, horizontal driving signal HD, subcarrier signal $F_{SC}$, composite synchronizing signal SY, blanking signal BL and burst flag signal BF are generated. The horizontal driving signal HD is applied to a one-shot multivibrator 30 which produces a pedestal clamp pulse. This pedestal clamp pulse is supplied to the clamping circuit 28, whereby the DC component is added to the video signal $V_{in}$. The subcarrier signal $F_{SC}$ is supplied to a four-time frequency multiplier 31, in which it is converted to the signal with the frequency four times (4 $F_{SC}$) high the original frequency. This signal with the frequency 4 $F_{SC}$ is supplied to the sampling circuit 29 as the sampling frequency, whereby the video signal $V_{in}$ thus clamped is sampled and then the sampled output thereof is supplied to a quantizing circuit 32 so as to be quantized and converted to a binary code. The number of the quantizing levels of the video signal $V_{in}$ may suit to $2^8 = 256$.

On the other hand, the signal with the frequency 4 $F_{SC}$ derived from the four-time frequency multiplier 31 is supplied to an FM frequency generator 33 the FM frequency from which is locked to the synchronizing signal, from which of respective 256 quantizing levels, FM frequencies $f_0$, $f_1$, $f_2$, ..., $f_8$ corresponding to nine levels of $2^0$, $2^1$, $2^2$, ..., $2^8$ are produced. Other than the above FM frequencies, the FM frequency generator 33 produces an FM frequency $f_{SY}$ representing the level of the composite synchronizing signal SY, an FM frequency $f_p$ representing the pedestal level, an FM frequency $f_{B-H}$ representing the high level of the burst signal and an FM frequency $f_{B-L}$ representing the low level of the burst signal. Although further details of the FM frequency generator 33 with the synchronizing lock will be described later, the FM frequencies as described above are all synchronized with the frequency $F_{SC}$. The FM frequencies $f_0$ to $f_8$ and $f_p$ are supplied to a video level FM frequency generator 34 which produces an FM frequency corresponding to respective levels of a sampled video signal which is produced by such a manner that some of the frequencies $f_0$ to $f_8$ and $f_p$ are selected in accordance with the binary codes supplied from the quantizing circuit 32 and representing the video level of the video signal excluding the period of the synchronizing signal. This video level FM frequency generator 34 will be described in detail later. Further, the signal with the frequency 4 $F_{SC}$ derived from the four-time frequency multiplier 31 is introduced into a burst phase signal generator 35, from which signals $F_{B-H}$, $F_{B-O}$ and $F_{B-L}$ to decide respective phases of the high level, zero level and low level of the burst signal are produced. The burst phase signal generator 35 will also be described later.

The composite synchronizing signal SY derived from the color lock composite synchronizing signal generator 5 is applied through an inverting amplifier 36 to one input terminal of NAND gate 37, while the FM frequency $f_{SY}$ derived from the FM frequency generator 33 is applied to the other input terminal thereof. Then, the output of the NAND gate 37 is supplied to one input terminal of a NOR gate 44. The composite synchronizing signal SY is applied to one input terminal of a NAND gate 39. Besides, the NAND gate 39 is supplied at its other input terminals with the blanking signal BL supplied through an inverting amplifier 38 and with the burst flag signal BF and the FM frequency $f_p$ directly. The output of the NAND gate 39 is supplied to one of the input terminals of the NOR gate 44. The burst flag signal BF is also supplied respectively through an inverting amplifier 40 to one input terminal of each of NAND gates 41, 42 and 43. The NAND gate 41 is supplied at its other input terminals with the phase signal $F_{B-O}$ representing the zero level of the burst signal and the FM frequency $f_p$, while the NAND gate 42 is supplied at its other input terminals with the phase signal $F_{B-L}$ representing the low level of the burst signal and the FM frequency $f_{B-L}$. In addition, the NAND gate 43 is supplied at its other input terminals with the phase signal $F_{B-H}$ representing the high level of the burst signal and the FM frequency $f_{B-H}$, respectively. The outputs of these NAND gates 41, 42 and 43, and the output of the video level FM frequency generator 34 are added to, in addition to the aforesaid inputs, the remaining input terminals of the NOR gate 44. As described above, at the output of the NOR gate 44, there is produced a desired FM frequency synchronized with the subcarrier signal $F_{SC}$.

The vertical driving signal VD generated by the color lock composite synchronizing signal generator 5 is supplied to a flip-flop 46 which produces a field pulse. This field pulse is then supplied to a flip-flop 47, in which a frame pulse is formed.

A circuitry shown by a dotted line in FIG. 3 will be mentioned later.

Figure 4:
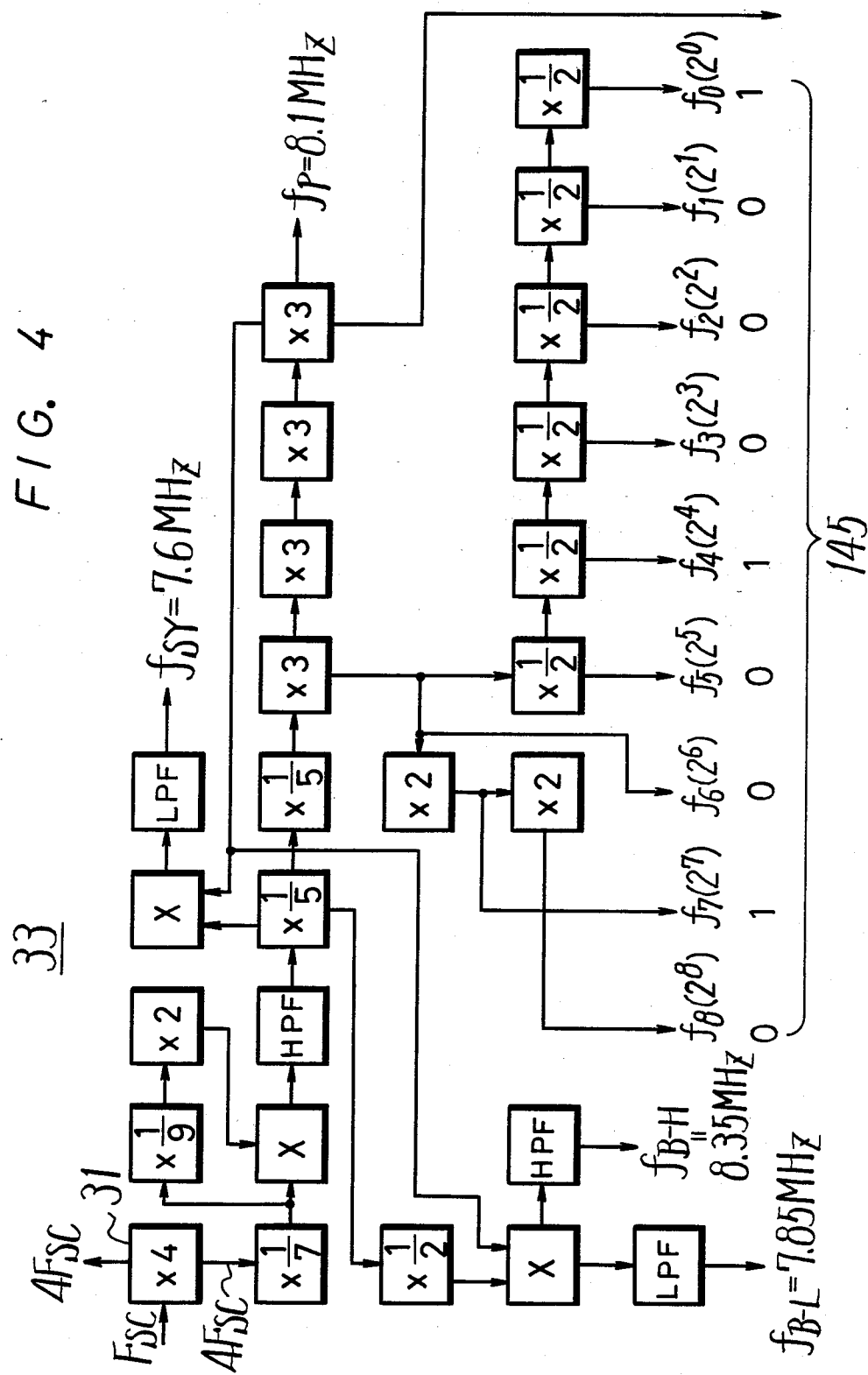
FIG. 4 is a block diagram schematically showing one example of the digital FM frequency generator with the synchronizing lock shown in FIG. 3.

FIG. 4 is a block diagram sechmatically showing an example of the FM frequency generator 33 shown in FIG. 3. In the figure, blocks indicated by x n and x(1/n) (where n is a positive integer) represent a frequency multiplier to convert a frequency to n times the original frequency and a frequency divider to convert the frequency to 1/n times the original frequency. Blocks indicated by x represent multiplying circuits. Moreover, blocks indicated by HPF represent high pass filters, while blocks indicated by LPF represent low pass filters. These high and low pass filters HPF and LPF serve to derive either of higher (sum) or lower (difference) frequencies from sum and difference signals between two input frequencies appearing at the outputs of the multiplying circuits X. If with the arrangement shown in FIG. 4 the subcarrier (burst) signal of 3.58 MHz is taken as the base and the frequency multiplying, frequency-dividing and multiplying processes of the frequencies are performed, there are respectively provided frequencies of 7.6 MHz as $f_{SY}$, 8.1 MHz as $f_p$, 8.35 MHz as $f_{B-H}$ and 7.85 MHz as $f_{B-L}$, each being described in FIG. 3, and they are used as respective FM frequencies corresponding to the levels of the composite synchronizing signal SY, the pedestal level, the high level and low level of the burst signals when the video signal is frequency-modulated (refer to FIG. 8). Also, for FM frequencies corresponding to nine quantizing levels of the video signal such as $2^0, 2^1, \ldots, 2^8$, $f_0 \approx 4.69$ kHz, $f_1 \approx 9.37$ kHz, $f_2 \approx 18.7$ kHz, $f_3 \approx 37.5$ kHz, $f_4 \approx 75$ kHz, $f_5 \approx 0.15$ MHz, $f_6 \approx 0.3$ MHz, $f_7 \approx 0.6$ MHz and $f_8 \approx 1.2$ MHz are established. The FM frequency $f_p$ equivalent to the pedestal level is utilized, which will be described later, to compose or mix the video level FM frequencies.

Figure 5A:
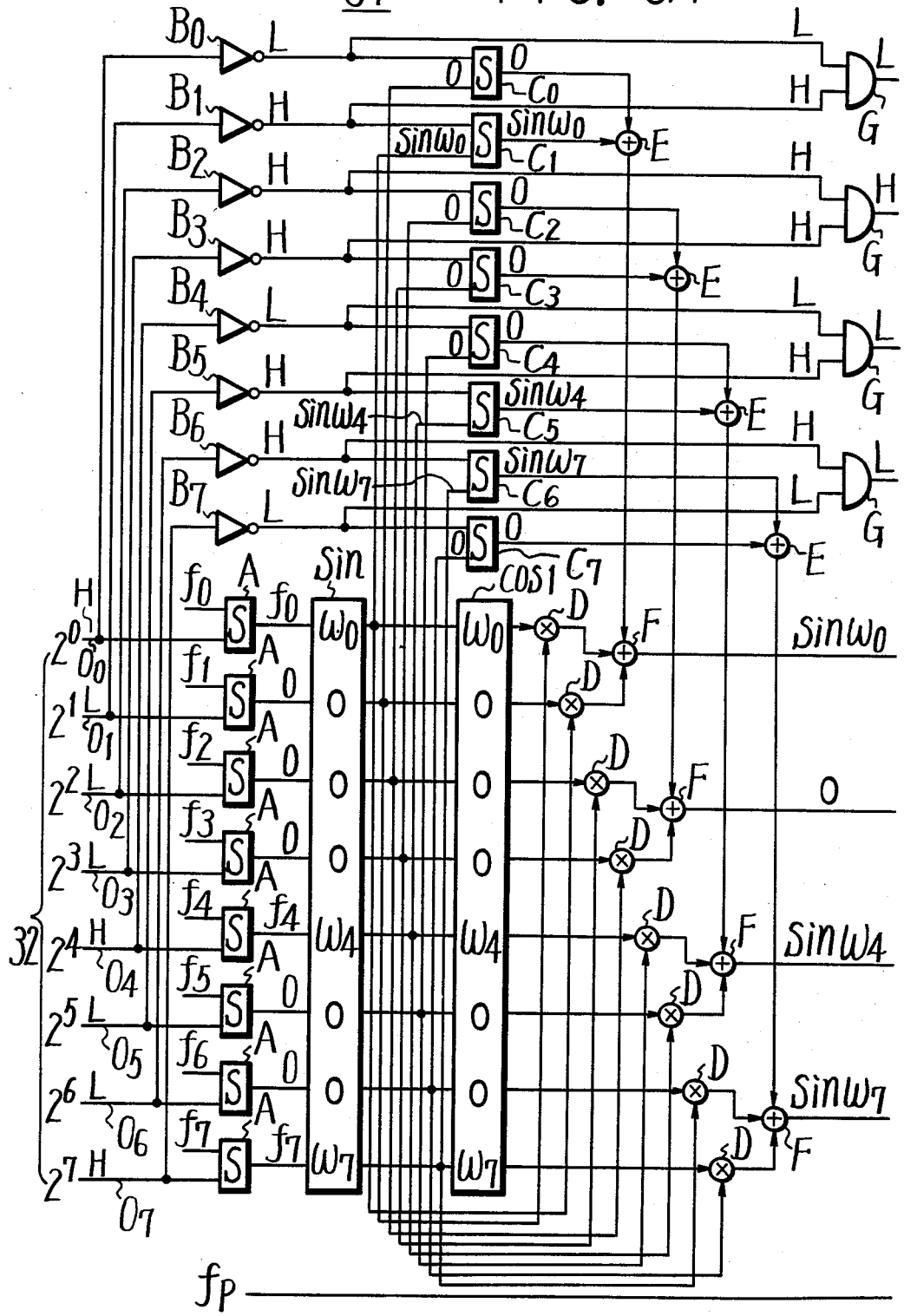
FIG. 5 (formed of FIGS. 5A and 5B) is a block diagram showing one example of the video level FM frequency generator shown in FIG. 3.

FIG. 5 is a circuit block diagram schematically showing an example of the video level FM frequency generator 34 shown in FIG. 3. In the figure, each of blocks with reference letters S represents an analog switch to allow an analog signal from one input terminal to flow therethrough when a high level signal H appears at the other input terminal, but to inhibit such analog signal from flowing therethrough when a low level signal L appears thereat. Blocks shown by ⊗ represent multipliers, blocks shown by ⊕ adders, a block suffixed by sin a sine wave section acting as a buffer amplifier in this example and blocks shown by cos, cos 1, cos 2, cos 3 and cos 4 represent phase shifters of 90°, respectively. Taking a case where the quantized video levels are given as 145 as an example for simplicity, operations to mix FM frequencies corresponding to the levels will be described hereinafter.

The binary code representation corresponding to 145 is 010010001 as shown in FIG. 4, so that in FIG. 5 at output lines $O_0$, $O_4$ and $O_7$ corresponding to $2^0$, $2^4$ and $2^7$ of respective output lines $O_0, O_1, \ldots, O_7$ corresponding to $2^0, 2^1, \ldots, 2^8$ of the quantizing circuits 32 of FIG. 3, there appear high level signals H, while at other output lines $O_1$ to $O_3$ and $O_5$, $O_6$, there remain the low level signals L (in the figure, an output line corresponding to $2^8$ is omitted in brevity). Accordingly, the analog switches S of the first stage connected by the output lines $O_0$ to $O_7$ at their one input terminals (shown by reference letters A) permit only the FM frequencies $f_0$, $f_4$ and $f_7$ of $f_0, f_1, \ldots, f_8$, which are supplied at their other input terminals from the FM frequency generator 33 shown in FIGS. 3 and 4, to be passed therethrough and then supplied to the sine wave section at the next stage or buffer amplifier sin. If angular velocities of the FM frequencies $f_0$ to $f_8$ are respectively taken as $\omega_0$ to $\omega_8$, the FM frequencies are expressed as $f_0 = \sin \omega_0$, $f_1 = \sin \omega_1$, $f_2 = \sin \omega_2 \ldots$, $f_8 = \sin \omega_8$. The sin $\omega_0$, sin $\omega_4$ and sin $\omega_7$ passing through the buffer amplifier sin are sent to a first phase shifter cos 1, in which they are phase-shifted by 90° so as to be converted to cos $\omega_0$, cos $\omega_4$ and cos $\omega_7$, while the sin $\omega_0$, sin $\omega_4$, and sin $\omega_7$ are also applied to one input terminals of the analog switches S (shown by letters $C_0$ to $C_7$) which are connected at their other input terminals with the output lines $O_0$ to $O_7$ through the inverting amplifiers $B_0$ to $B_7$, each of which inverts the aforesaid high and low level signals H and L, and to the multipliers ⊗ (shown by letters D) provided at the output side of the fi phase shifter cos 1. The respective sin signals applied to the above analog switches S, namely, $C_1$, $C_5$, $C_6$ are supplied at other input terminals thereof with the high level signals H, which are provided by inverting the low level signals L, so that they are passed through the analog switches S, namely, $C_1$, $C_5$, $C_6$ and further supplied through adders ⊕ (shown by letters E) to adders ⊕ (shown by letters F) at the output side of the first phase shifter cos 1. In the above multipliers ⊗ shown by letters D, even if one input terminals thereof supplied with the signal sin or signal cos from the first phase shifter cos 1, the other input terminals thereof are applied with O signals, so that all of their outputs become zero. Therefore, the respective signals sin $\omega_0$, sin $\omega_4$ and sin $\omega_7$ are supplied through the foregoing adders ⊕ shown by letters F to a second phase shifter cos 2, and as shown in the figure, also supplied respectively to one input terminals of the analog switches S identified by letters I which are supplied at their other input terminals with outputs from the AND gates identified by letters G. In these analog switches S shown by letters I, only the sin $\omega_0$ signal is passed therethrough by the logic shown in the figure, which is further supplied through an adder ⊕ shown by letter J to an adder ⊕ denoted by letter K and provided at the output side of the second phase shifter cos 2. A signal to be added to the signal sin $\omega_0$ by the adder K at the output side of the second phase shifter cos 2 is zero so that the signal from the adder K is the sin $\omega_0$, which is directly supplied to a third phase shifter cos 3. Whereas, outputs sin $\omega_7$·cos $\omega_4$ and sin $\omega_4$·cos $\omega_7$ from multipliers ⊗ identified by letters M and N and provided at the output s of the second phase shifter cos 2 are added to each other by an adder P so as to be converted to a sin $(\omega_4+\omega_7)$, which is supplied to the third phase shifter 3. Similarly, an adder ⊕ denoted by letter Q at the output side of the third phase shifter cos 3 produces a sin $(\omega_0+\omega_4+\omega_7)$.

On the other hand, the FM frequency $f_p$ corresponding to the pedestal level is supplied to a phase shifter cos so as to be converted to a cos $\omega_p$, which is multiplied by a multiplier R with the above sin $(\omega_0+\omega_4+\omega_7)$ thus resulting in a cos $\omega_p$·sin $(\omega_0+\omega_4+\omega_7)$. At the output side of a fourth phase shifter cos 4 supplied with the sin $(\omega_0+\omega_4+\omega_7)$, the sin $\omega_p$ is multiplied with the cos $(\omega_0+\omega_4+\omega_7)$ by a multiplier T so as to be converted to a sin $\omega_p$·cos$(\omega_0+\omega_4+\omega_7)$. Thereafter, the cos $\omega_p$·sin $(\omega_0+\omega_4+\omega_7)$ is added to the sin $\omega_p$·cos $(\omega_0+\omega_4+\omega_7)$ by an adder U so as to produce a sin $(\omega_p+\omega_0+\omega_4+\omega_7)$ finally. This output signal sin $(\omega_p+\omega_0+\omega_4+\omega_7)$ is the very FM frequency corresponding to the video levels 145. Let this output signal sin $(\omega_p+\omega_0+\omega_4+\omega_7)$ be $f_{(145)}$. Then $f_{(145)} \approx 8.78$ MHz is established. The FM frequencies corresponding to other video levels of the video signals excluding the synchronizing parts will be mixed or composed similarly.

FIG. 6 is a block diagram showing an example of the burst signal generator 35 shown in FIG. 3, and FIGS. 7A through 7G are waveform diagrams each being useful for explaining the operation thereof. In FIG. 6, numerals 50 and 51 designate JK flip-flops for use in dividing the frequencies, 52 to 55 designate AND gates, and 56 designates an OR gate. The frequency 4 $F_{SC}$ (refer to FIG. 7A) derived from the frequency multiplier 31 in FIG. 3 is applied to a terminal $T_1$ of the JK flip-flop 50 and a terminal $T_2$ of the JK flip-flop 51. Thus, the frequency 2 $F_{SC}$ one-half the foregoing frequency 4 $F_{SC}$ is produced at a terminal $Q_1$ of the JK flip-flop 51 (refer to FIG. 7B). At a terminal $Q_2$ of the JK flip-flop 51 which is supplied at its terminals $J_2$ and $K_2$ with the frequency 2 $F_{SC}$ from the terminal $Q_1$ of the flip-flop 50, there is produced a frequency $F_{SC}$ one-half the frequency 2 $F_{SC}$ (refer to FIG. 7C). If the outputs 2 $F_{SC}$ and $F_{SC}$ at the terminals $Q_1$ and $Q_2$ are supplied to two input terminals of the AND gate 52, whereby the signal $F_{B-L}$ representing the low level period of the burst signal (refer to FIG. 7D) is produced therefrom. This signal $F_{B-L}$ is applied to the NAND gate 42 shown in FIG. 3. If the outputs at the terminals $Q_1$ and $\overline{Q_2}$ of the flip-flops 50 and 51 are supplied to two input terminals of the AND gate 53, the signal $F_{B-H}$ representative of the high level period of the burst signal is produced (refer to FIG. 7F) therefrom. This signal $F_{B-H}$ is applied to the NAND gate 43 in FIG. 3. Similarly, at the output of the AND gate 54 to the input terminals of which the outputs at the output terminals $\overline{Q_1}$ and $Q_2$ of the flip-flops 50 and 51 are supplied, and at the output of the AND gate 55 to input terminals of which the outputs at the terminals $Q_1$ and $\overline{Q_2}$ of the JK flip-flops 50 and 51 are supplied, there are produced two signals $F_{B-O}$ (refer to FIGS. 7E and 7G), each representing the zero level period of the burst signal, which are supplied through an OR gate 56 to the NAND gate 41 shown in FIG. 3.

As stated above, in the digital FM modulation section shown in FIG. 3 according to the present invention, the FM frequencies corresponding to the respective levels of the quantized video signals with the levels of the predetermined number and the FM frequencies corresponding to various synchronizing signals are all locked to the subcarrier (burst) signal $F_{SC}$. Therefore, when the video signal is recorded on the recording disc (refer to FIG. 1) with the one frame on one circle (one rotation of the disc), the difference of the video signals between the neighbouring tracks is generally small so that the dots or pits of the respective tracks are aligned in the radius direction of the disc or arrayed in the same phase.

Figure 8:
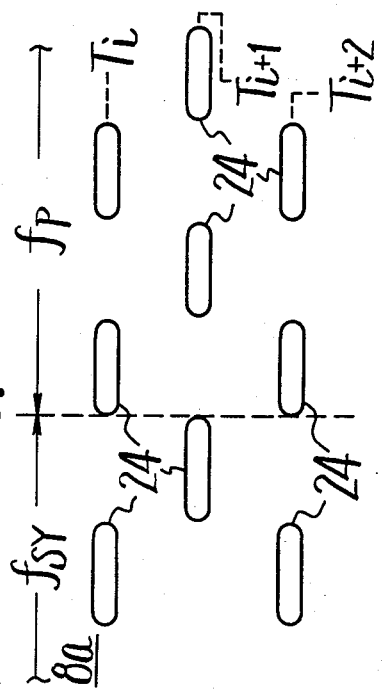
FIG. 8 is an enlarged diagram showing FM frequencies at respective parts of a video signal according to the present invention.

FIG. 8 is an enlarged diagram showing the FM frequencies of the video signals at the respective portions according to the present invention.

Figure 9:
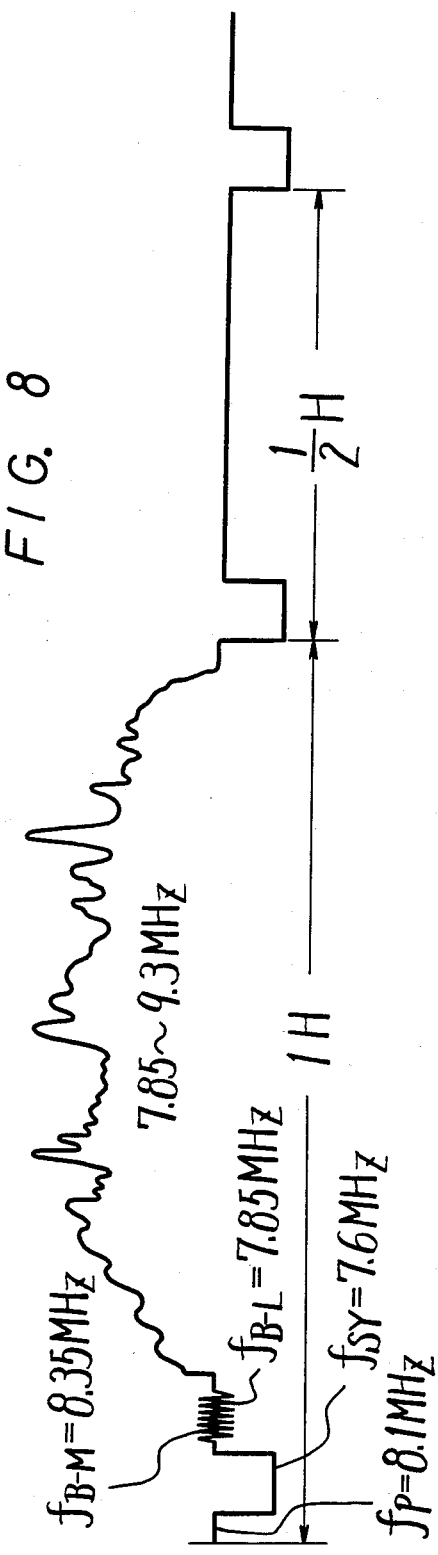
FIG. 9 is an enlarged diagram showing a state where pits are arranged with the same phase as one other.

FIG. 9 is an enlarged diagram showing the arrangement states of the pits 24 near the boundary of the FM frequencies $f_{SY}$ and $f_p$ of the video signal recorded at the FM frequency on the recording surface 8a of the recording disc 8. When the pits 24 are accurately arranged in phase with each other between the adjacent tracks $T_i$ and $T_{i+1}$ or $T_{i+1}$ and $T_{i+2}$ as seen in the above, in the reproducing mode, free from the size of the reproduced beam, the possibility to cause the crosstalk and jitter is quite reduced.

Figure 10:
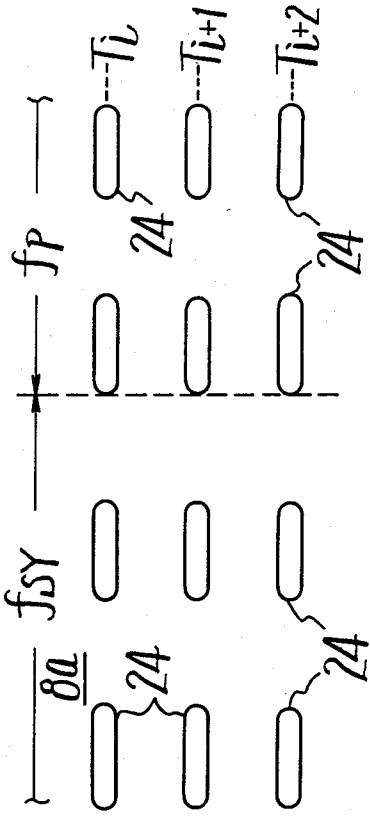
FIG. 10 is an enlarged diagram showing a state where the pits are arranged in opposite phase.

FIG. 10 is an enlarged diagram similar to FIG. 9 showing that the phase of the FM frequency is inverted at every frame in the recording mode. In this case, although the pits 24 are arranged in opposite phase to each other between the adjacent tracks $T_i$ and $T_{i+1}$ or $T_{i+1}$ and $T_{i+2}$, the effect same as that where the pits 24 are arranged in-phase with one other is also achieved in this case.

To invert the phase of the FM frequency at every one frame, it is sufficient to add such circuit arrangement as shown by the dotted line in FIG. 3. That is, the frame pulses in phase and in opposite phase supplied from the flip-flop 47 are supplied to one input terminals of the NAND gates 58 and 59, while the output FM frequencies of the NOR gate 44 are directly supplied to the other input terminal of the NAND gate 58, and the NAND gate 59 is supplied at its other input terminal with the above output FM frequencies from the NOR gate 44 inverted by an inverting amplifier 60. Since the NAND gates 58 and 59 produce outputs alternately at every one frame, if these outputs are applied to a NOR gate 61 where their logic sum is calculated, the FM frequency whose phase is inverted at every one frame is produced therefrom.

Figure 1:
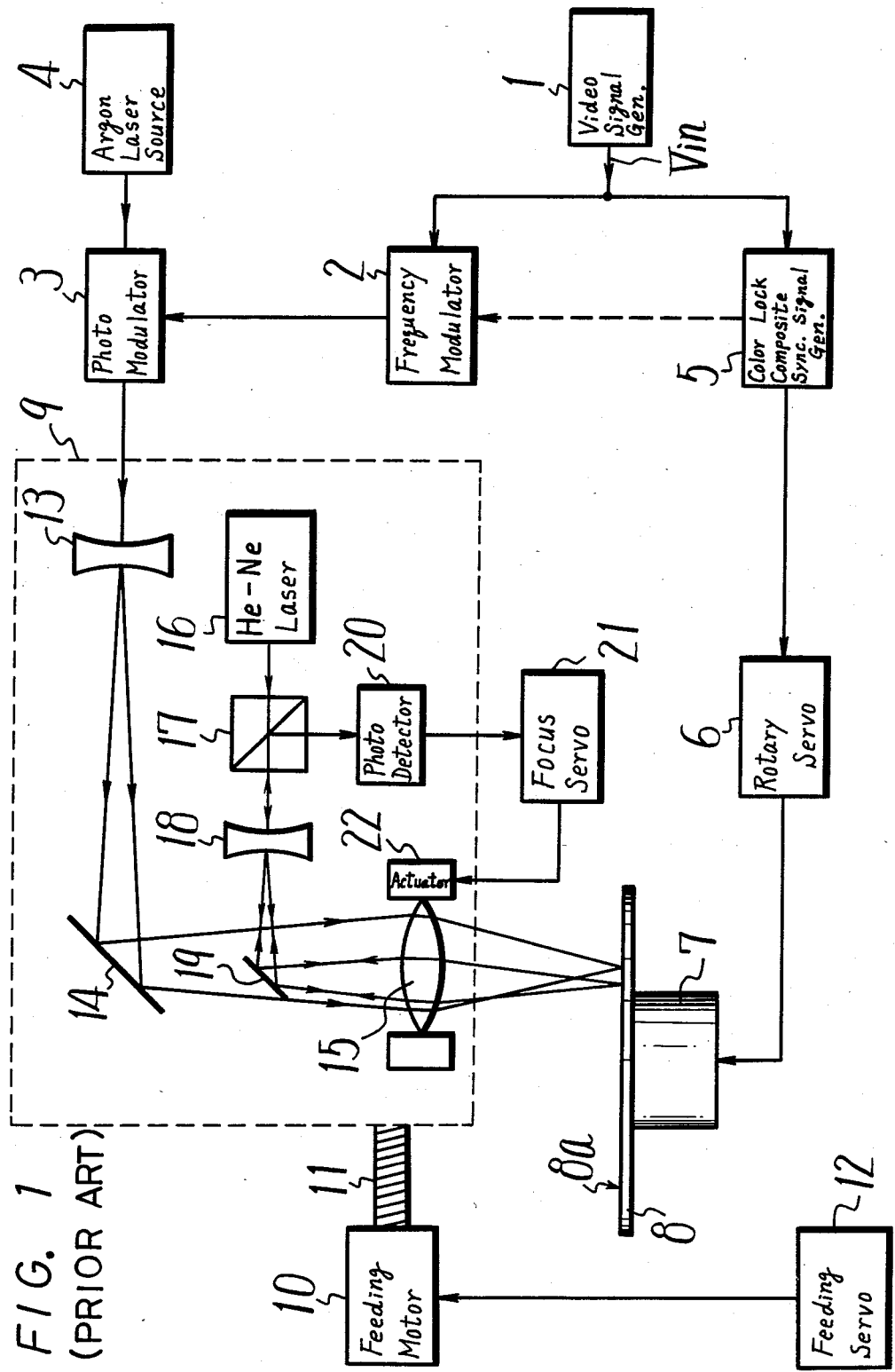
FIG. 1 is a systematic block diagram schematically showing a prior art video disc recording apparatus.
Figure 2:
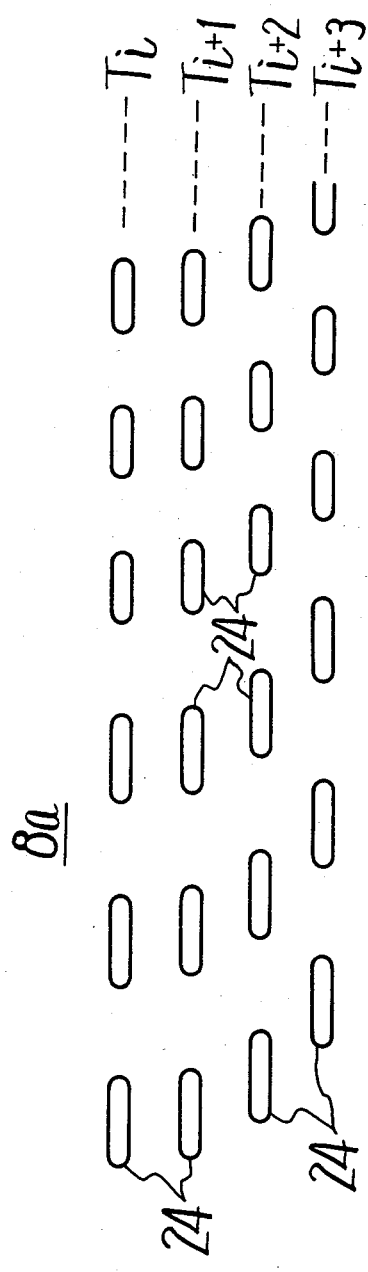
FIG. 2 is an enlarged diagram showing a pit arrangement state of a prior art video disc.

Although not shown in FIG. 3, the laser sources, the optical system thereof, the recording disc, the driving apparatus, the servo apparatus and the like used in the invention are similar to those of FIG. 1 so that they are not shown in the figure and hence, they will not be described in detail.

While in the above description, the present invention is applied to the both of the periods of the video signal and the synchronizing signal, it is not necessary that the present invention is not limited to the above. That is, the video signal period of the video signal excluding the synchronizing signal period is not quantized similarly to the prior art apparatus, but it is possible they may be frequency-modulated directly.

FIG. 11 shows the essential part of another embodiment of the present invention where such case is described. Different parts of this embodiment from those of FIG. 3 will be mainly described hereinafter, in which the sections for the burst signal and video signal periods of the example shown in FIG. 3 will be removed, but instead, a known FM modulator 34' is used. That is, the FM modulator 34' is applied with a television signal containing the synchronizing signal and supplied from the clamping circuit 28, where this television signal is frequency-modulated in the same manner as the prior art. The output therefrom is supplied to one input terminal of a NAND gate 62. The NAND gate 62 is supplied at its other input terminal with such a signal as follows. That is, the blanking signal BL and the burst flag signal BF passed through the inverting amplifier 38 are supplied to input terminals of NAND gate 63, whereby a pulse excluding the burst signal period is formed and then applied to the other input terminal of the NAND gate 62 mentioned above.

The output of the NAND gate 62 is supplied to one input terminal of the NOR gate 44. Other elements and parts on the example of FIG. 11 are substantially the same as those of the example in FIG. 3 and hence detailed descriptions thereof will be omitted.

With the arrangement thus made, similarly to the prior art apparatus, the television signal modulated in the FM system by the FM modulator 34' is produced in which the blanking period excluding the burst signal period is removed in the NAND gate 62 and then applied to the NOR gate 44. Accordingly, during the video signal period, similarly to the known apparatus, the pits will never be arranged along the radial line on the recording disc, while during the synchronizing signal period, when in a manner same as illustrated in FIG. 3 the pits are recorded on the recording disc in the form of one frame corresponding to one circle, the pits during this interval are radially arranged so that the crosstalks between the tracks at the part of the synchronizing signal are reduced extremely.

As shown in FIG. 12, the present invention can be applied without difficulty where signal to be recorded during the video signal period is not of an analog signal system, but of a digital signal system. In this case, the known signal format of the video signal frequently used is formed of, as shown in FIG. 12, a reference signal 64 having a white reference level $f_w$ equal to the white level of the video signal and serving as the reference for the level of the signal and a digital data signal 65. In the above, a high level $f(w/2)$ of the digital data signal 65 is selected to be one half the level of the white level $f_w$, while a low level $f_B$ of the digital data signal 65 is selected to be the level equal to the black level of the video signal. Accordingly, in this case, the digital FM signal generator of FIG. 3 is simplified in construction to be such one as shown in FIG. 13. That is, in FIG. 13, a reference signal separating circuit 66, which receives the video signal $V_{in}$ from its generator 1, is provided to separate the part of the video signal $V_{in}$ in FIG. 12 exceeding the one-half level $f(w/2)$ of the white level, while a data separating circuit 67 is supplied with the video signal $V_{in}$ to separate the part of the video signal $V_{in}$ exceeding the black level $f_B$. Sine these separating circuits 66 and 67 can be easily constructed by using the known level comparing circuit or comparator, they will not be described in detail.

One example of the FM frequency generator 33 shown in FIG. 13 is given in FIG. 14. This FM frequency generator 33 according to the example of FIG. 14 has less kinds of the frequencies to be generated than those of FIG. 4. But, based upon the similar principle to that of FIG. 4, respective frequencies of $f_w=9.3$ MHz, $f(w/2)=8.78$ MHz, $f_B=8.27$ MHz, $f_{SY}=7.6$ MHz and $f_p=8.1$ MHz corresponding to a white reference level $f_w$ synchronized with the subcarrier signal $F_{SC}$, a data "1" level (one-half the white level), namely, $f(w/2)$, data "0" level (black level), namely, $f_B$, the synchronizing signal level $f_{SY}$ and the pedestal level $f_p$, which are all synchronized with the signal $F_{SC}$, are produced. Also, in the example of FIG. 13, of the above respective frequencies, the frequencies $f_{SY}$ and $f_p$ are processed by the NAND gates 37 and 39 similarly to FIG. 3. But, as to the frequency $f_p$, since in this case, the burst signal does not exist as shown in FIG. 12, unlike the case of FIG. 3, the burst flag signal BF is not supplied to the NAND gate 39. As regards the frequencies $f_w$, $f(w/2)$ and $f_B$, as shown in FIG. 13, the periods during which the respective frequencies are produced are determined by the frequency modulator 34'' based upon the outputs of the respective separating circuits 66 and 67 and then they are applied to the gate 44. In other words, the frequency $f_w$ is supplied to one input terminal of a NAND gate 72, which is supplied at its other input terminal with the output of the separating circuit 66, whereby it is applied to the OR gate 44 during only the period of the reference signal 64 (refer to FIG. 12) separated by the separating circuit 66. Moreover, the frequency $f(w/2)$ is applied through a NAND gate 69 to the OR gate 44 only in the period during which the digital data signal 65, separated by the separating circuit 67, is at high level. However, the NAND gate 69 is applied with the signal provided by inverting the reference signal 64 by an inverting amplifier 68, so that the frequency $f(w/2)$ will never be mixed into the period of the reference signal 64.

Also, the output of the separating circuit 67 is inverted by an inverting amplifier 70 and supplied to a NAND gate 71, so that the frequency $f_B$ is applied to the OR gate 44 during only the period in which the digital data signal 65 is at low level. But, the NAND gate 71 is applied with the blanking signal BL so that the frequency $f_B$ will never be mixed into the blanking period including the synchronizing signal and the like.

If the circuitry is arranged so far, similarly to the description of FIG. 3, when the digital information is recorded on the video disc in the television signal system, it is also possible to arrange or form the pits between the adjacent tracks in the alignment state.

While in FIG. 13, the digital information is recorded in the system of television signal, the digital information is not necessary recorded thereon in the system of television signal. In short, it is sufficient that the respective digital informations are recorded interposing the synchronizing signal therebetween with a constant interval.

By way of example, as shown in FIG. 15, the present invention can also be applied to such a signal format that a digital data 100 formed of the synchronizing signal and a digital data 101 formed of the data signal system are arranged one after another. In this case, when both the digital data 100 and 101 are of NRZ (non return to zero) system, as shown in FIG. 17, two frequencies $f_H$ and $f_L$ synchronized with the NRZ signals corresponding to high level "1" and low level "0" of this NRZ signals are formed, in which similarly to the above, the frequency $f_H$ is passed during the period of the high level "1", and the frequency $f_L$ is passed during the period of the low level "0" thus the FM output being produced.

FIG. 16 is a schematic block diagram showing a synchronizing lock FM frequency generator for such purpose as described above, while FIGS. 17A through 17D are waveform diagrams of the above signals at the respective parts. To be more definite, a clock signal $f_H$, which, as shown in FIG. 17A, rises up at time $t_1, t_2, \ldots, t_n$ on the boundaries of the intervals assigned to one-bit data of the NRZ signal shown in FIG. 17C and has a period equal to the width of the interval of one bit thereof, is employed. This clock signal $f_H$ is directly applied to one input terminal of a NAND gate 75 shown in FIG. 16 as the frequency $f_H$. Also, the above clock signal $f_H$ is frequency-divided into ½ by a frequency-dividing flip-flop 73 so as to produce a signal $f_L$ rising or falling at the above times $t_1, t_2, \ldots, t_n$ shown in FIG. 17B, which is supplied to one input terminal of a NAND gate 76. The NAND gates 75 and 76 are respectively supplied at their other input terminals with the NRZ signal and a signal provided by inverting the NRZ signal by an inverting amplifier 74. The outputs of these NAND gates 75 and 76 are applied to a NOR gate 77 to produce an FM signal output shown in FIG. 17D.

Whereas, the rotation of a disc on which this FM signal is recorded is synchronized with the above clock signal $f_H$, and the rotational period thereof is selected to be some integer times the period in which the digital data 100 of the above synchronizing signal is generated.

With the arrangement thus composed, similarly to the above embodiment, the synchronizing signal is recorded on the radial line of the disc with the alignment state so that during the synchronizing interval, the pit arrangement is aligned. Therefore, even if the crosstalk occurs between the adjacent tracks, no trouble will be caused. Furthermore, as shown in FIG. 18, since between the adjacent tracks $T_i$ and $T_{i+1}$, a rising time of a pit 102 of the FM signal recorded on the first track $T_i$ is coincident with rising times of pits 103 and 104 of the FM signal recorded on the second track $T_{i+1}$ or falling times thereof, by way of example, when crosstalk derived from the pit 104 in the second track $T_{i+2}$ is detected after the pit 102 in the first track $T_i$ is detected. Thus the detection of the pit 102 in the first track $T_i$ is extended by the length of the pit 104 in the second track $T_{i+1}$. Accordingly, the front or leading edge of the pit 102 is not fluctuated. Also, when crosstalk is detected from the pit 103, the leading edges of the pits 102 and 103 are coincident with one other so that the leading edge of the pit 102 is not fluctuated.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A recording apparatus for recording a recording signal, which includes synchronizing signals having equal intervals, therebetween, on a disc comprising:

signal generating means for generating a plurality of signals with frequencies synchronized in phase with said synchronizing signals;

selecting means for selecting signals with frequencies, corresponding to the respective levels of said recording signal, from said plurality of signals to provide a frequency-modulated signal;

means for synchronizing the rotation of said disc, on which said recording signal is recorded, with said synchronizing signal to thereby rotate said disc at a constant angular velocity and at a constant speed being a whole multiple of the period of said synchronizing signal; and a means for recording the output from said selecting means on said rotating disc.

2. The recording apparatus as claimed in claim 1, wherein said synchronizing signal includes horizontal and vertical synchronizing signals, each being derived from a television synchronizing signal system.

3. The recording apparatus as claimed in claim 1, wherein said recording means is an optical recording device.

4. The recording apparatus as claimed in claim 1, wherein said recording means is a magnetic recording device.

5. A recording apparatus as claimed in claim 1, wherein each level of said recording means is equal to each level of synchronizing signal intervals of said recording signal.

6. The recording apparatus as claimed in claims 1 to 4, wherein said signal generating means and said selecting means include digital converting means for quantizing respective levels of said recording signal to be converted to a digital value, means for generating a signal with a frequency weighted at every bit in said digital value and corresponding to the bit, means for selecting a signal with a corresponding frequency from said signal with the frequency in accordance with a level of each bit in said digital value, and composing means for adding these signals with the frequencies so as to compose a frequency corresponding to said digital value.

7. A recording apparatus as claimed in claim 6, wherein said composing means includes phase shifting means for providing a sine wave signal and a cosine wave signal which are different in phase by 90° and have the same level from first and second frequency signals supplied thereto, first multiplying means for multiplying the sine wave signal for said first frequency signal from said phase shifting means with the cosine wave signal for said second frequency signal therefrom so as to produce a product thereof, second multiplying means for multiplying the cosine wave signal for said first frequency signal with the sine wave signal for said second frequency signal so as to produce a product thereof, and adding means for adding outputs of said first and second multiplying means so as to produce a third frequency signal having a frequency of a sum between said first and second frequency signals.

* * * * *